April 12, 1966     E. ANWANDER     3,246,194
STEEL-CAPSULED MERCURY-VAPOUR DISCHARGE VESSEL
Filed March 27, 1963     4 Sheets-Sheet 1

INVENTOR
Elmar Anwander

BY Pierce, Scheffler & Parker
ATTORNEYS

United States Patent Office 3,246,194
Patented Apr. 12, 1966

3,246,194
STEEL-CAPSULED MERCURY-VAPOUR
DISCHARGE VESSEL
Elmar Anwander, Baden, Switzerland, assignor to Aktiengesellschaft Brown, Boveri & Cie., Baden, Switzerland, a joint-stock company
Filed Mar. 27, 1963, Ser. No. 268,289
Claims priority, application Switzerland, Mar. 30, 1962, 3,925/62
10 Claims. (Cl. 313—167)

The invention relates to a steel-capsuled mercury-vapor discharge vessel having at least one anode and one cathode.

It is known that the vapour pressure is of great significance for the working characteristic of a mercury-vapour discharge vessel. In this context one differentiates between a dynamic and a static component of the vapour pressure. The dynamic component arises due to the flow in the discharge vessel itself whereas the static vapour pressure is for the greater part dependent on the vessel temperature.

In order to be able to control the vapour pressure better, it has already been suggested that orifices should be introduced between anode and cathode, by means of which the vapour pressure component being dependent on the vessel current is kept at least in part away from the valve so that in the valve space in fact only static pressure is of effect. By this means, the vapour pressure of the vapour discharge vessel becomes strongly dependent on the vessel temperature, and operation with rated load and especially overload is possible only in a very narrow temperature range. Thus, in order that such vessels remain completely serviceable, they are subjected to a temperature regulation of the space or on the vessel (one, two and three stage regulation or continuous regulation of the cooling-air ventilator, or regulation of the cooling-water quantity) or, respectively, to a heating.

It has also been suggested that the vessels be filled with inert gas and thus by this means obtain right from the start a higher gas pressure in the vessel even with a cold vessel. Such inert gas charges have, however, the disadvantage that they are used up with the passage of time and most especially with the occurrence of current pulses. This can only partially be recuperated. A further disadvantage is that with higher vessel temperatures, the vapour pressure of the mercury exceeds those values permissible for adequate sealing capacity and tensile strength. Due to an additional inert gas pressure, this upper temperature limit is reduced further, all the more as the dependence of the breakdown voltage on the pressure is greater and more unfavorable with most inert gases than is the case for mercury-vapour.

Most especially at high peak loads, a narrow working temperature range of about 10° C. had formerly to be adhered to, which latter being scarcely doubled with an inert gas charge, as due to the additional pressure of the latter the temperature range was admittedly extended downwards, but at the same time, cut off at the top. For this reason, rather expensive check, control and heating arrangements were necessary for the maintenance of the temperature of the converters which in part had to be replaced or, respectively, supplemented by tempering of the space. The screen electrodes as employed up to the present have in all cases been so designed that an opening on to the vessel wall remains as viewed from the cathode. Through this, the higher vapour density arising at the cathode can take effect without hindrance right up to the vessel wall. This is especially of disadvantage too if the shell is to serve at the same time as recombination screen for the charge carrier. Additionally, the vapour pressure controlling effect cannot be realized.

The task is now presented of finding an apparatus with which the vapour density of the discharge is, as far as possible, independent of the vessel temperature. One must here attempt to make the vapour pressure within the arc range independent of the outside temperature. For this it is an object of the invention that a vapour envelope be provided between the vessel and the anode-cathode gap, this envelope being so dimensioned and formed, as well as being provided with such apertures, that at a given vessel temperature and rated current the exit velocity of the vapour out of the envelope attains at least half sonic velocity.

The foregoing as well as other objects and advantages inherent in the invention will become more apparent from the following detailed description of various typical embodiments of the invention when considered with the accompanying drawings. In these drawings.

Figure 1:
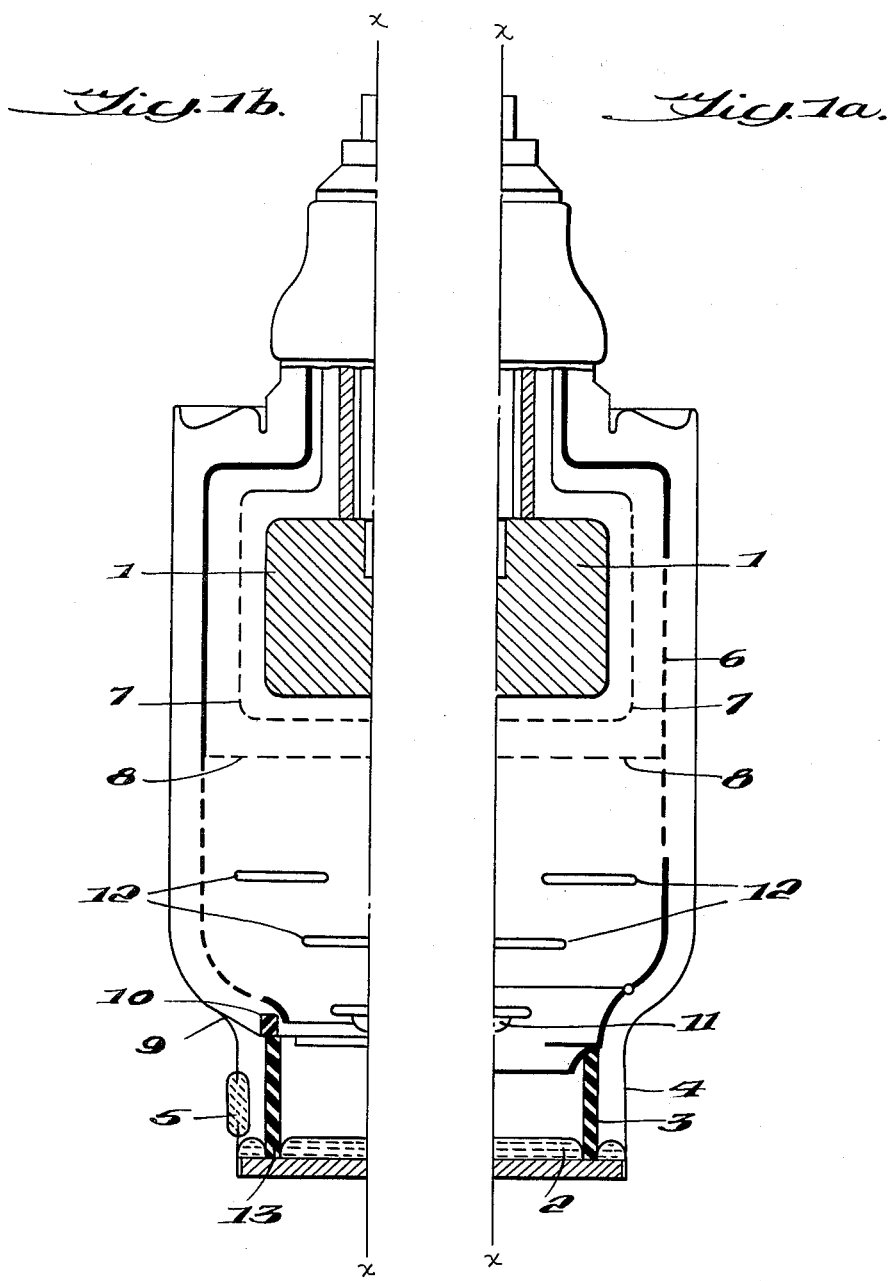
FIGS. 1a and 1b are vertical half central sections to the right and to the left, respectively, of center line x—x, it being understood that the other unillustrated halves of these views are identical with the halves which have been illustrated.

With reference now to the drawings, and to FIGS. 1a and 1b in particular, which shows the invention as applied to a single-anode vessel, in two slightly different forms, the steel walled vessel itself in each case is denoted by 4, the cathode by 2 and the anode by 1. In the embodiment of FIG. 1a, to the right of the center line, the mercury cathode 2 is connected electrically with the wall of vessel 4. In the embodiment to the other side of the center line, FIG. 1b, cathode 2 is isolated electrically from the vessel wall by means of an insulating sleeve 5, in the FIG. 1a construction an insulating sleeve 3 is inserted into the mercury cathode 2, and a similar insulating sleeve 13 is inserted into the cathode. The control grid for FIGS. 1a and 1b is designated by 7 and in both FIGS. 1a and 1b, the de-ionizing grids between the anode and cathode are indicated at 8. In both embodiments, the exciter anode is shown at 11 and the orifices provided in the vapour envelope 6 are indicated at 12. This vapour envelope 6, in both embodiments, extends from the anode 1 to the cathode 2 and lies adjacent to them so that from the cathode, no direct vapour flow can reach the wall of vessel 4. That is to say, it must pass through the apertures 12 since envelope 6 substantially closes off the space between the steel wall 4 and the discharge gap between anode 1 and cathode 2, this close-off being complete except for the array orifices 12 in the wall of the envelope. In the embodiment of FIG. 1a, the lower end of the vapour envelope lies against the upper end of insulating sleeve 3 and is insulated from the vessel wall. In the embodiment of FIG. 1b, the vapour envelope shell 6 is connected with the vessel wall 4 at point 9 by means of an annular distance piece 10 which rests upon the upper end of sleeve 13. Distance piece 10 should function as a thermal insulator, but conversely is not required to insulate electrically. In this manner, the construction is greatly simplified.

In the slightly different embodiments illustrated in

Figure 2:
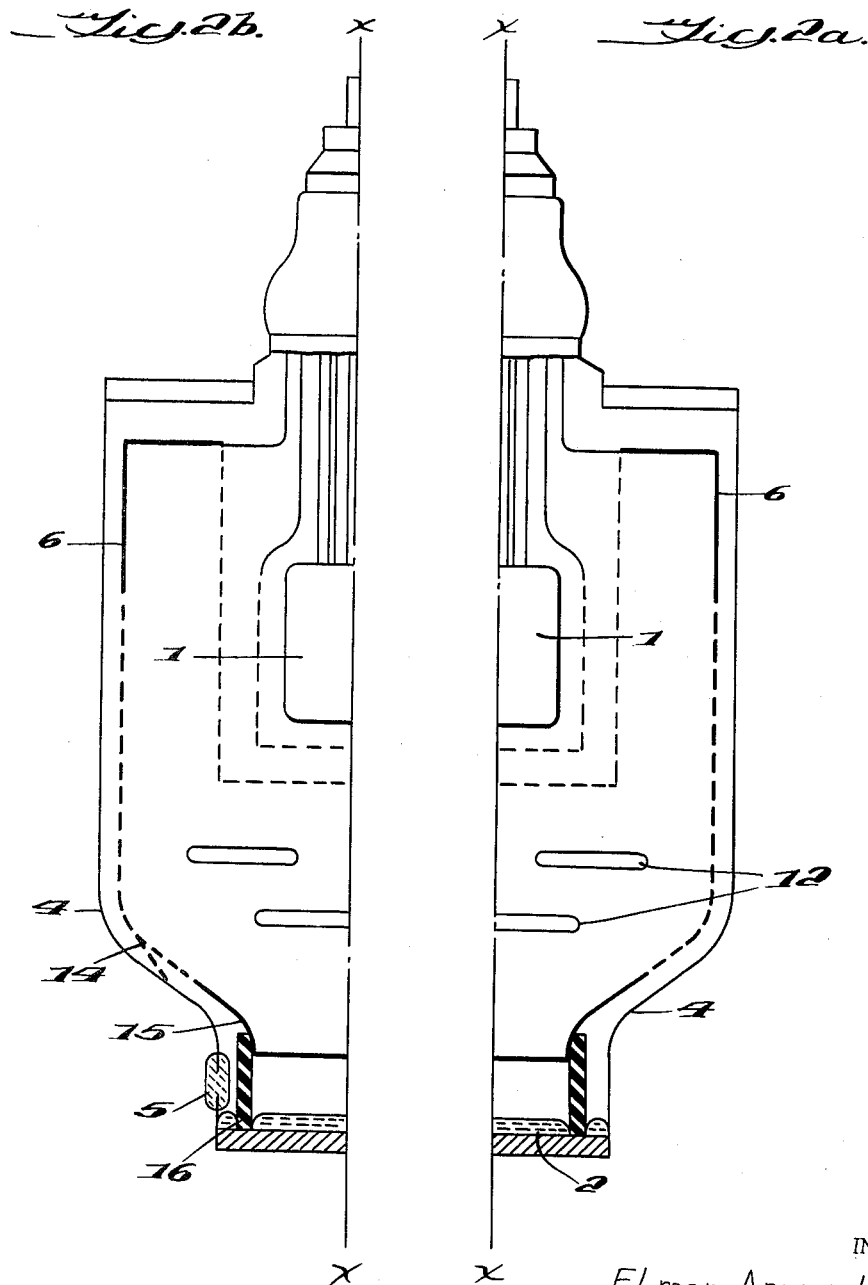
FIGS. 2a and 2b are also vertical half central sections to the right and to the left, respectively, of center line x—x of a second, single anode embodiment, the convention observed here being the same as in FIGS. 1a, 1b.

FIGS. 2a and 2b respectively, the cathode 2 in FIG. 2a is connected electrically with the vessel wall 4 while in FIG. 2b the cathode is insulated from the vessel wall by the insulating sleeve 5. FIG. 2b shows two variations of the support for the vapour envelope 6 provided with the apertures 12. The first type of support is uninsulated electrically and includes a stay 14 to the vessel wall 4 which is a poor thermal conductor. The second includes a supporting piece 15 resting upon an insulating sleeve 16 which in turn is supported upon the floor of the mercury cathode 2. Insulating sleeve 16 is both thermal and electrically insulating and can be made, for example, of quartz.

The method of operation is now as follows: The vapour envelope 6 with the apertures 12 lies between the vapour flow from the vessel wall 4 being cooled and the cathode 2, and completely surrounds the discharge between anode and cathode. By this means, the vapour density within the envelope and discharge valve is determined by the choice of size and number of apertures 12 in the envelope shell 6. The envelope shell has a compensating effect on the temperature variation with the vapour pressure. For low temperatures it raises on one side the vapour pressure—as it may not drop below a given critical pressure laid down by the vapour flow—and on the other hand it reduces at the same time the influence of the wall temperature on the condensation by increasing the velocity of vapour flow up to sonic velocity, this then having the effect that at higher temperatures the vapour density in the vessel is lower than before. The strong vapour flow out of the apertures in the envelope shell makes condensation easier with the result that it can take place in the face of a weakly flowing vapour with a greatly decreased excess pressure (excess over the vapour pressure at condensate temperature). By this means, the discharge vessel can be operated in a greatly extended vessel-temperature range without regulation of the vessel temperature and without an inert gas charge.

An envelope shell of this type can also be formed to act at the same ttime as a recombination screen with a corresponding shape, i.e. for the neutralization of the charge carriers. In this case the only point of importance is that the apertures in the envelopes be so formed that the ratio of their depth to their breadth be greater than 3.

Figure 3:
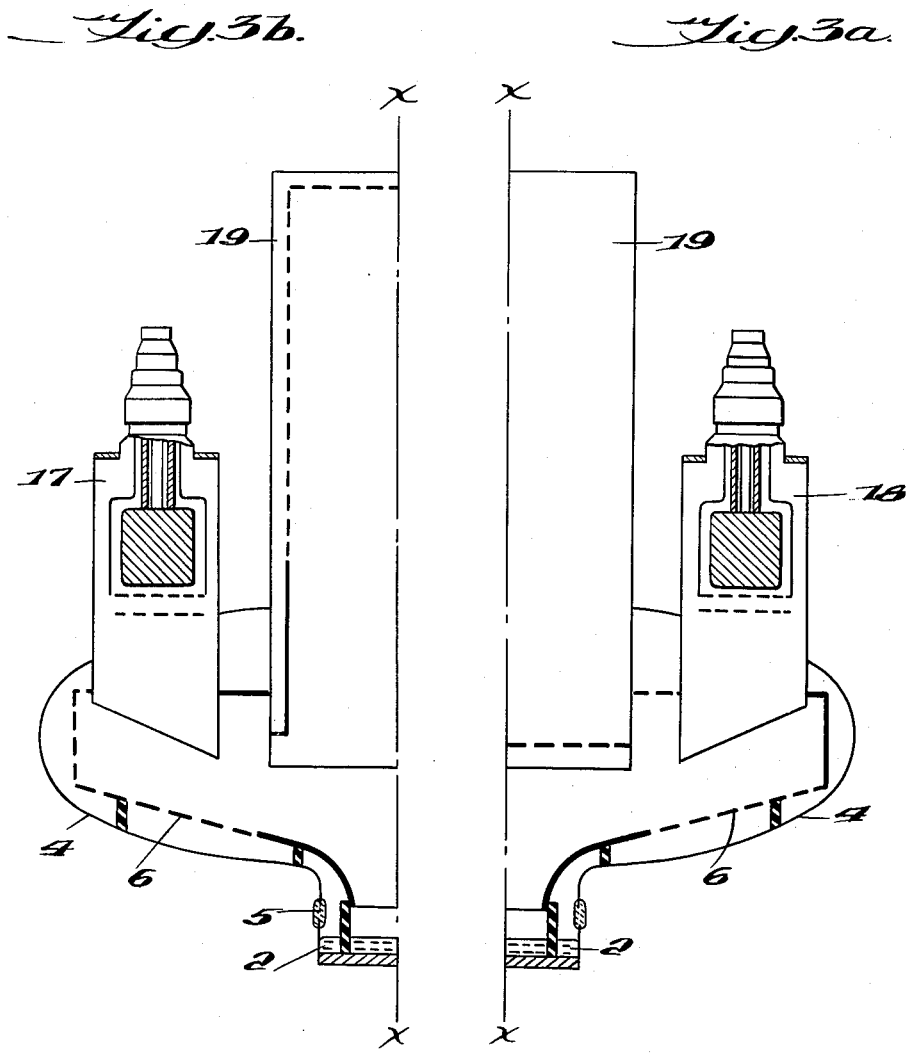
FIGS. 3a and 3b are also vertical half central sections to the right and to the left, respectively, of center line x—x of an embodiment with multiple anodes, the convention observed here being the same as in FIGS. 1a and 1b.

In FIGS. 3a and 3b are shown a multi-anode vessel which incorporates the invention. This consists of the vessel, the wall of which is once more indicated with 4, the cathode 2, which in this case is represented as being insulated from the vessel wall, and the anodes 17 and 18. In between lies vapour dome 19. The vapour envelope is once more designated with 6 and in both variations of the design, shown to the left and right of the center-line, is a closed line within the vapour dome, this running between the cathode, the anode 18, vapour dome 19, the anode 17 and back again to the cathode. With multi-anode vessels one has thus the advantage that only a single vapour envelope is required for all the anodes.

Figure 4:
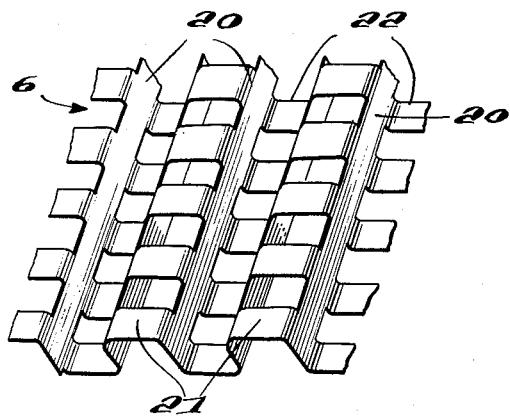
FIG. 4 is a partial perspective view showing one suitable embodiment for the vapour envelope.

In FIG. 4 is represented a constructional example of the vapour envelope 6 with apertures, this consisting of strip-formed surfaces 20 which are connected with one another by crosspieces 21 and 22. The crosspieces 21 lie on the upper side, crosspieces 22 on the lower side. The surfaces 20 do not necessarily have to lie parallel, they can also be at an angle to one another. In this is shown a design of vapour envelope which can be produced with simple means and which results in a certain depth between the inner space of the vessel and the space between vapour envelope and vessel wall. One can also choose other designs for the envelope shell, for example, perforated plate, honeycomb plate, wire gauze, etc. At the same time one can also employ the vapour envelope as a lead to the exciter anode, as in FIGS. 1a and 1b by connecting exciter anode 11 electrically with vapour envelope 6 and providing the contact lead to the exciter circuit, e.g. above as an insulated bushing through the anode plate. In addition, the de-ionizing grid can also be connected with the envelope shell and be borne by the latter, this then resulting in further constructional simplifications.

Figure 5:
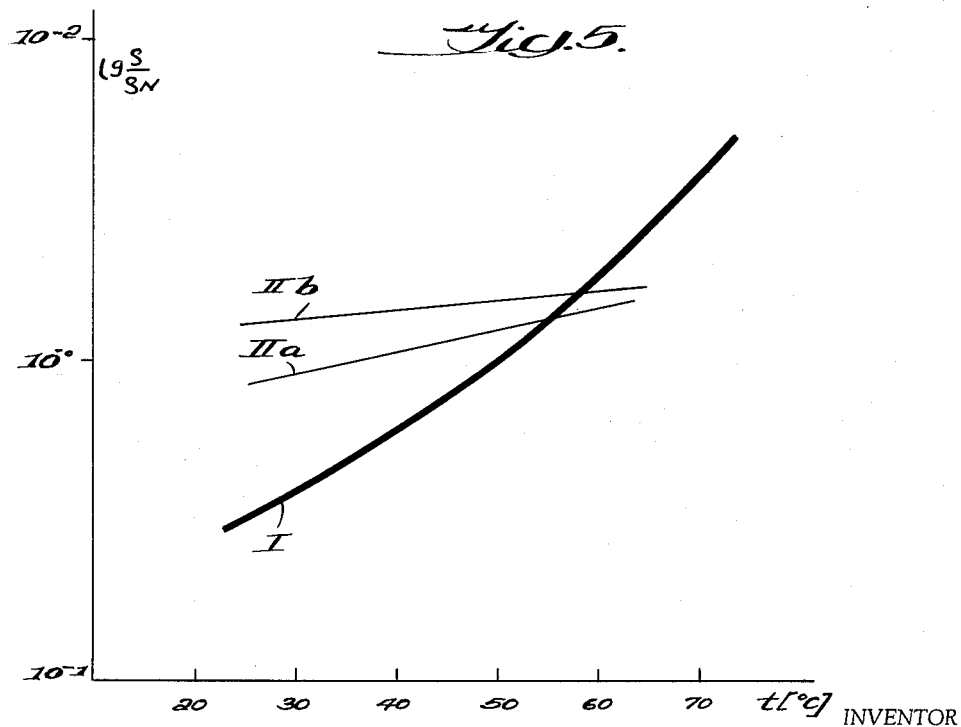
FIG. 5 is a family of curves illustrating variation in vapour density in explanation of the invention.

The main advantage of the vapour envelope is that the vapour density within the valve space, as according to FIG. 5, displays a greatly reduced dependence on the temperature. FIG. 5 represents the temperature curve of the vapour density $\rho$ referred to the vapor density $\rho_n$ at 50° C. vessel temperature and constant vessel current. Curve I indicates the relation within a vessel without a vapour envelope, and curves IIa and IIb the relation of density within the envelope shell at various shell apertures.

Over and above this strong flattening-off of the temperature curve, the envelope shell offers as a further special advantage the possibility of being able to feed in high current pluses with a cold vessel, this having been impossible formerly without preheating of the vessel because of the very low vapour density. The vapour density within the envelope shell does not remain at the low saturated-vapour value given by the vessel temperature when the current is switched on but rather climbs in a few milliseconds to the end-value which is stationary and corresponds to this temperature and the relevant current. This value is given by FIG. 5 curve IIa or respectively IIb. In this case, however, the envelope shell must be warmer than the vessel in order that there results the pressure increase in this manner and not by chance a condensation on the envelope shell. This is always the case with interruptions in operation of only a few hours as the envelope shell is not in thermal contact with the vessel and its heat may only be given up with slowly decreasing temperature (the radiation sinks with the fourth power of the temperature). The envelope certainly takes up in operation a considerable portion of the power loss of the vessel in the form of recombination heat and for lack of thermal contact with the vessel wall can only give it up to the latter by means of radiation, i.e. by means of a high temperature.

With longer operational stand-stills, it is sufficient if the excitation be switched on sometime beforehand in order that the envelope shell be brought to the required temperature, this period corresponding to the heat capacity of the envelope shell and the losses taken up by it. The heating of the envelope shell can be achieved with considerably smaller power (exciting current) in a shorter time than the heating of the whole vessel, this being due to the heat capacity being smaller by more than one order of magnitude and furthermore to the radiation being only detectable at high temperatures.

A further advantage of the arrangement is that the vapour envelope screen can also serve at the same time as a recombination screen.

I claim:

1. A steel-capsuled mercury-vapour discharge vessel having at least one anode and one cathode arranged therein with a gap therebetween, and a vapour envelope located within said vessel between the vessel wall and the gap between said anode and cathode, said vapour envelope serving to effect substantially a close-off of the space between said vessel wall and said anode-cathode gap, and said close-off being complete except for access provided by an array of orifices distributed around the wall of said envelope, and said orifices serving to effect a strong flow of vapour therethrough from said anode-cathode gap to said vessel wall which attains a velocity of at least one-half sonic during operation of said discharge vessel at its rated current and at a given temperature.

2. A steel-capsuled mercury-vapour discharge vessel as defined in claim 1 wherein said vapour envelope lies tightly against said cathode.

3. A steel-capsuled mercury-vapour discharge vessel as defined in claim 1 wherein said vapour envelope is closed over above said anode.

4. A steel-capsuled mercury-vapour discharge vessel as defined in claim 1 and which further includes means electrically insulating said vapour envelope from said cathode.

5. A steel-capsuled mercury-vapour discharge vessel as defined in claim 1 and which further includes means electrically insulating said vapour envelope from said cathode, means insulating said cathode from the wall of said vessel, and means thermally insulating said vapour envelope from the wall of said vessel.

6. A steel-capsuled mercury-vapour discharge vessel as defined in claim 1 and which further includes means electrically insulating said vapour envelope from said cathode which in turn is electrically connected with the wall of said vessel, and means electrically and thermally insulating said vapour envelope from the wall of said vessel.

7. A steel-capsuled mercury-vapour discharge vessel as defined in claim 1 wherein said orifices in said vapour envelope are so formed that the ratio of their depth to their breadth is greater than three.

8. A steel-capsuled mercury-vapour discharge vessel as defined in claim 1 wherein said vapour envelope is constructed as an angular grid which includes strip-formed surfaces which are connected to one another by crosspieces vertical to said surfaces, said crosspieces lying alternately at one side or the other of said surfaces.

9. A steel-capsuled mercury-vapour discharge vessel as defined in claim 1 which includes a plurality of anodes and a vapour dome located between said anodes and a single vapour envelope is provided for all of said anodes.

10. A steel-capusled mercury-vapour discharge vessel as defined in claim 9 wherein said envelope passes through said vapour dome.

References Cited by the Examiner

UNITED STATES PATENTS 2,729,761    1/1956    Bosch _____ 313—167

GEORGE N. WESTBY, *Primary Examiner.*

D. E. SRAGOW, *Assistant Examiner.*